May 29, 1951   H. ELOFSON   2,554,669
STRAW BREAKING AND SPREADING ATTACHMENT FOR COMBINES
Filed June 14, 1949   2 Sheets-Sheet 1

Inventor

Harry Elofson

By *Clarence A. O'Brien and Harvey B. Jacobson*
Attorneys

May 29, 1951        H. ELOFSON        2,554,669

STRAW BREAKING AND SPREADING ATTACHMENT FOR COMBINES

Filed June 14, 1949        2 Sheets-Sheet 2

Inventor

Harry Elofson

By Clarence A. O'Brien
and Harvey B. Jackson
Attorneys

Patented May 29, 1951

2,554,669

UNITED STATES PATENT OFFICE 2,554,669

STRAW BREAKING AND SPREADING ATTACHMENT FOR COMBINES

Harry Elofson, East Grand Forks, Minn.

Application June 14, 1949, Serial No. 98,937

6 Claims. (Cl. 275—3)

This invention relates to a device to be mounted on the rear of a combine and has for its primary object to break up and uniformly distribute or spread straw on the ground behind the combine. The even distribution of cut straw on the ground behind the combine facilitates plowing and other working of the ground, inasmuch as there will be no bunches or piles of straw to hamper machinery working this ground.

A further object of this invention is to provide a device of the character described which is relatively simple in design and construction, easy to attach to the rear of a combine and derives its power from any one of the conventional power take-off shafts of the combine, such as the straw rack, the fan shaft, the beater shaft or the cylinder shaft.

Yet another object of this invention is to provide in a combine having a rear hood and a power take-off shaft; a device for breaking up and spreading straw comprising a housing, means for attaching said housing to the rear of the combine, a rearwardly and downwardly inclined baffle carried by said housing and positioned beneath said rear hood for receiving straw emitted therefrom, straw breaking means carried by said housing and driven from said power take-off shaft, and means carried by said housing for uniformly distributing the cut straw upon the ground.

These, together with various ancillary objects and features of the invention which will later become apparent as the following description proceeds, are attained by the device, a preferred embodiment of which has been illustrated, by way of example only, in the accompanying drawings, wherein.

Specific reference will now be made to the drawings. In the several views, in the accompanying drawings and in the following specification, similar reference characters indicate corresponding elements throughout.

Figure 1:
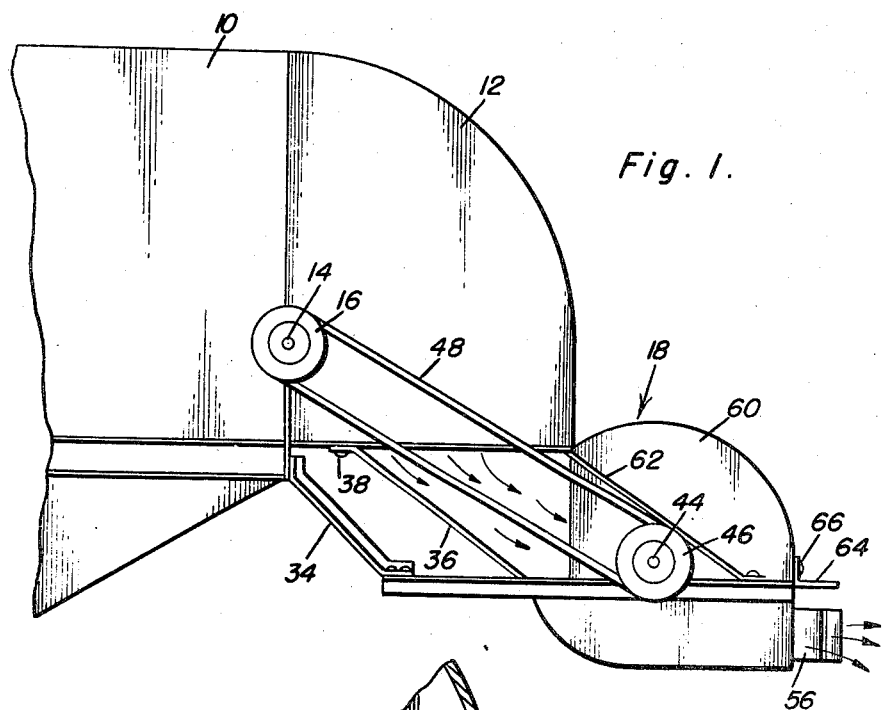
Figure 1 is a side elevational view of the device shown attached to the rear of a combine.
Figure 2:
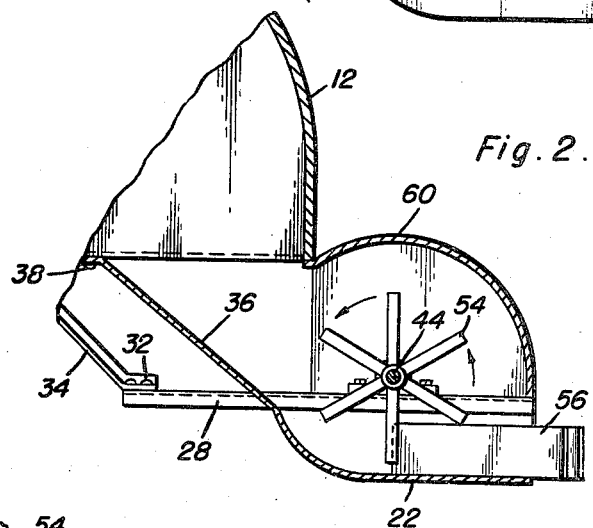
Figure 2 is a fragmentary longitudinal sectional view through the device.
Figure 5:
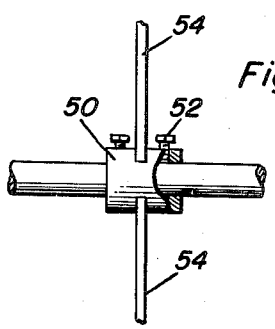
Figure 5 is a side elevational view of a portion of the rotatable transverse shaft illustrating the manner of attaching the cutter blades thereto.

Indicated generally at 10 is a conventional combine, to the rear of which is attached the usual hood 12 and depending through one side of the combine is a power take-off shaft 14, said shaft either being the straw rack, the fan shaft, the beater shaft, or the cylinder shaft. Secured on the end of the shaft 14 for rotation therewith and disposed outside the chassis of the combine is a pulley 16.

The device of the instant invention is generally indicated at 18, and, as shown clearly in the drawings, consists of a housing 20 having a base member 22, to the sides of which are secured, as by welding or riveting, side members 24 and 26 having flanges 28 and 30, respectively, at their upper ends. The flanges are forwardly extending and secured to their forward ends, as at 32, are angulated angle irons 34 which are, in turn, secured as by welding or riveting to the rear of the chassis 10 beneath the discharge hood 12. Integral with the bottom or base member 22 of the housing, which, as shown in the drawings, is preferably arcuated, is a rearwardly and downwardly inclined baffle plate 36 which extends beneath the open end of the hood 12 and is appropriately secured to the bottom edges of the hood, as at 38.

Secured to the flanges 28 and 30, as at 40, is a pair of aligned roller bearings 42 for rotatably receiving a transversely extending shaft 44, one end of which carries a sheave or pulley 46. An endless web 48 is entrained over the pulleys 16 and 46, and thus it will be seen that the power take-off shaft 14 is operatively connected to the transverse shaft 44 for rotating the latter.

Loosely received upon the shaft 44, are a plurality of collars 50 which may be adjustably secured to the transverse shaft 44 for rotation therewith by means of appropriate set screws 52 extending through the collars. In other words, the collars may be adjusted for any desired spacing along the longitudinal axis of the transverse shaft 44.

Each collar 50 has secured thereto radially extending shredders or beaters 54, it being preferred that each collar have two such shredders which are diametrically opposed. It will also be observed from Figure 4 that the shredder blades 54 are positioned on the collars 50 in a staggered relation with respect to each other. The shredder blades 54 are of such length that they do not extend to the bottom or base member 22 but are spaced therefrom.

Figure 3:
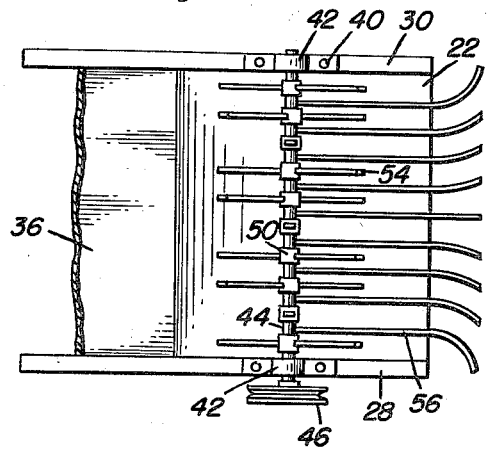
Figure 3 is a top plan view of the device with the hood or casing removed.

A means for distributing the straw broken by the shredders 54 uniformly on to the ground behind the combine is provided and consists of the following elements. A plurality of vertically extending transversely spaced plates 56 are provided which are welded at their bottom edges to the bottom or base member 22 and are positioned beneath the transverse rotatable shaft 44 to provide a plurality of guideways 58 for receiving the broken straw and each pair of shredder blades 54, as will be readily understood by reference to Figures 3 and 4. The rear ends of the plates 56 extend beyond the rear edge of the base member 22, these rear ends being arcuated in such a manner as to flare from the center of the housing to the opposite ends thereof, as shown clearly in the drawings.

Supported on the flanges 28 and 30 of the housing is an arcuated hood or casing 60 having side edges 62 which are secured in any appropriate manner at their upper ends to the bottom end of the combined hood 12. At its rear end, the casing 60 is provided with a transversely extending L-shaped plate 64 which is secured, as at 66, to the casing 60 for vertical adjustment thereon, the plate 64 serving as a means for confining the cut straw to direct the latter downwardly upon the ground behind the combine.

In practical operation, after the housing is appropriately attached to the rear of the combine, the power take-off shaft 14 will drive the transverse rotatable shaft 44 upon which are positioned the radially extending, staggered shredder blades 54. Straw emitting from the open bottom end of the combine hood 12 will fall upon the inclined baffle 36 and be guided into the guideways 58 between the plates 56. As they pass through these guideways, the shredder blades will break the straw and advance the same toward the rear arcuated ends of the plates 56, and because these plates are flared from the center to both sides of the housing, the straw will be evenly distributed upon the ground behind the combine. Not only will the rotating shredder blades 54 advance the straw through the guideways 58, but they will also serve as fans to create wind for advancing the straw. By adjusting the L-shaped plate 64 vertically upon the casing 60, the broken straw can be appropriately directed and confined for discharge behind the combine.

Figure 4:
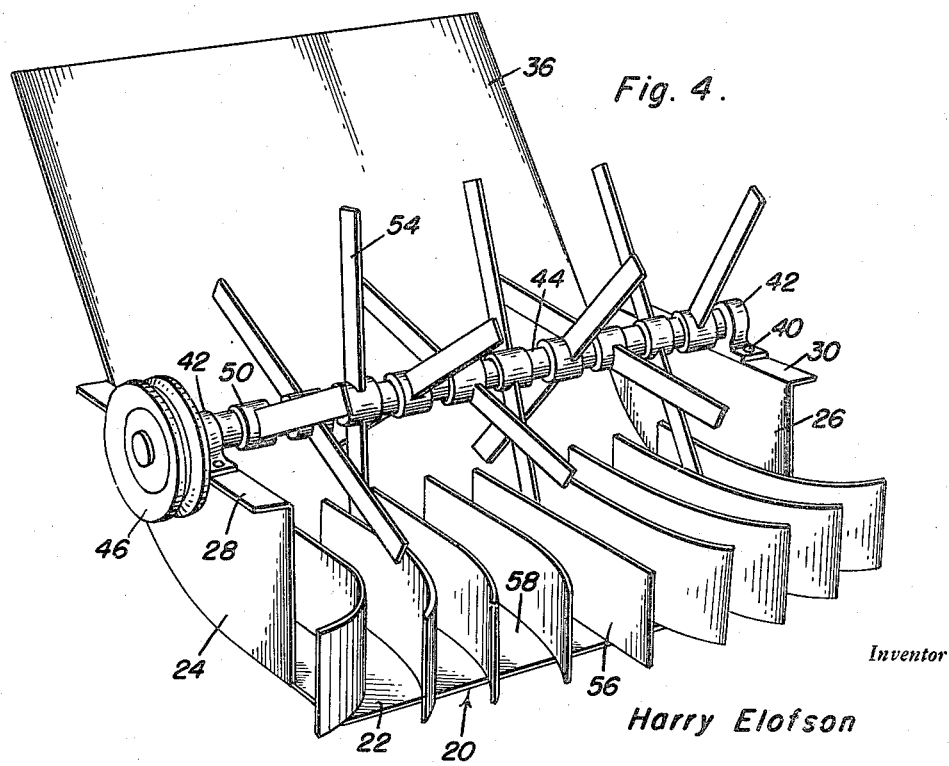
Figure 4 is a perspective view of that portion of the device including the cutter blades and the distributing plate.

It should be noted that the shredder blades 54 cooperate with the vertically extending plates 56 to effectively break or disintegrate the straw. The shredder blades 54 pass between the respective plates 56 and thrust the straw rearwardly during their passage between these plates. It should also be noted that by adjusting the collars 50 and their shredder blades 54 transversely to the housing, these shredder blades may be caused to pass during their rotation in very close proximity to the respective plates 56. As best shown in Fig. 4 these shredder blades 54, although they do not have a sharpened edge, are substantially rectangular in cross section. By positioning these shredder blades 54 so as to pass in close proximity to the plates 56, the cooperative disintegrating action attained is substantially increased. In other words, in addition to the tendency of the straw to be broken by the rapidly rotating shredder blades 54, a shearing action is produced by the forward ends of the plates 56 and the shredder blades 54. Thus it can be seen that I have provided a device capable of adjustment, to provide under normal conditions an almost entire breaking action upon the straw and when desired, under less favorable conditions, a combined breaking and shearing action thereupon.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a combine having a rear hood and a power take-off shaft; a device for breaking up and spreading straw comprising a housing, means for attaching said housing to the rear of the combine, a rearwardly and downwardly inclined baffle carried by said housing and positioned beneath said rear hood for receiving straw emitted therefrom, a transverse shaft rotatable on said housing, transversely spaced shredder blades, means for adjustably securing said blades to said transverse shaft, said means including collars received upon said transverse shaft and set screws extending through said collars for securing the latter in adjusted position upon said transverse shaft, said shredder blades extending radially from said collars, and means carried by said housing for uniformly distributing the broken straw upon the ground, said distributing means including vertically extending, transversely spaced plates carried by said housing adjacent the lower end of said baffle forming guideways for receiving the straw and the shredder blades, said plates including end portions extending beyond said housing, said end portions being arcuated to flare from the center to the sides of said housing.

2. The combination of claim 1 and a hood for enclosing said shredder blades, said hood including a transversely extending plate adjustably mounted thereon and overlying the end portions of said plates for confining the broken straw upon discharge from the device.

3. In a combine having a rear hood and a power take-off shaft; a device for breaking up and spreading straw comprising a housing, means for attaching said housing to the rear of the combine, a rearwardly and downwardly inclined baffle carried by said housing and positioned beneath the rear hood for receiving straw emitted therefrom, a transverse shaft rotatable on said housing and driven from the power take-off shaft, transversely spaced, radially extending shredder blades adjustably secured on said transverse shaft, and means carried by said housing for uniformly distributing the broken straw upon the ground, said distributing means including vertically extending transversely spaced plates carried by said housing adjacent the lower end of said baffle forming guideways for receiving the straw and the shredder blades, said plates including end portions extending beyond said housing, said end portions being arcuated to flare from the center to the sides of said housing.

4. The combination of claim 3 and a hood for enclosing said shredder blades, said hood including a transversely extending plate adjustably mounted thereon and overlying the end portions of said plates for confining the broken straw upon discharge from the device.

5. A straw breaking and spreading device for use in conjunction with a combine, comprising a housing adapted to be connected to the rear of the combine in the path of discharge of straw therefrom, a transverse shaft rotatably mounted in the housing and adapted to be connected to a source of power, transversely spaced and radially extending shredder blades mounted on the shaft and rotating therewith, means carried by the housing comprising vertically extending transversely spaced plates, the plates having forward edges and curved discharge ends, the forward edges of the plates cooperating with the blades to effectively disintegrate the straw, the spaces between the plates forming guideways for receiving the disintegrated and broken straw from the blades and the curved discharge ends effectively distributing the broken straw.

6. A straw disintegrating and spreading device for use in conjunction with a combine or the like, said device comprising a housing adapted to be connected to the rear of the combine across the discharge passage thereof in position to receive straw therefrom, a transverse shaft mounted for rotation across the interior of said housing and adapted to be connected with a source of rotary power, transversely spaced and radially extending shredder blades mounted on said shaft for rotation therewith, and means carried by said housing for cooperating with said shredder blades to effectively disintegrate the straw and for uniformly distributing the disintegrated straw upon the ground, said means including vertically extending transversely spaced plates carried by said housing adjacent said shredder blades in position for close cooperating disintegrating action therewith and forming guideways for receiving the straw and said shredder blades therebetween to guide the disintegrated straw as it is projected rearwardly by the shredder blades.

HARRY ELOFSON.

REFERENCES CITED

The following references are of record in the file of this patent:

UNITED STATES PATENTS

| Number | Name | Date |
|---|---|---|
| 742,016 | Fetzer | Oct. 20, 1903 |
| 808,799 | Woolman | Jan. 2, 1906 |
| 1,988,115 | Elphinstone | Jan. 15, 1935 |
| 2,245,081 | Pierce | June 10, 1941 |
| 2,281,846 | Klein | May 5, 1942 |
| 2,327,893 | Hobson | Aug. 24, 1943 |